United States Patent [19]
Eschbach

[11] Patent Number: 5,371,615
[45] Date of Patent: Dec. 6, 1994

[54] IMAGE-DEPENDENT COLOR CORRECTION USING BLACK POINT AND WHITE POINT IN A NATURAL SCENE PICTORIAL IMAGE

[75] Inventor: Reiner Eschbach, Webster, N.Y.

[73] Assignee: Xerox Corporation, Stamford, Conn.

[21] Appl. No.: 139,660

[22] Filed: Oct. 22, 1993

[51] Int. Cl.$^5$ ............................................... H04N 1/46
[52] U.S. Cl. ...................................... 358/515; 358/518
[58] Field of Search ............... 358/500, 515, 518, 529, 358/509, 516, 443, 296, 298, 461, 464; 355/326, 327; 348/673, 678, 251, 252, 615, 655, 28; 382/42; H04N 1/46

[56] References Cited

U.S. PATENT DOCUMENTS

| | | | |
|---|---|---|---|
| 2,571,697 | 10/1951 | Evans | 95/2 |
| 4,614,967 | 9/1986 | Sayanagi | 358/529 |
| 4,864,392 | 9/1989 | Sato | 358/529 |
| 5,315,380 | 5/1994 | Ingraham et al. | |

OTHER PUBLICATIONS

A. Usami, "Signal Processing by the Input Interface to a Digital Color Laser Copier", SID 90 Digest, 1990 pp. 498–500.

Primary Examiner—Edward L. Coles, Sr.
Assistant Examiner—Kim Yen Vu
Attorney, Agent, or Firm—Mark Costello

[57] ABSTRACT

A method for correcting color shifting produced by improper imaging, in a digital signal representation of a natural scene image including the steps of: determining the white point of an image; determining the black point in an image; calculating a color correction for the image as a function of the white point and the black point and applying the correction to each pixel in the digital signal representation of a natural scene image for printing.

22 Claims, 4 Drawing Sheets

IMAGE-DEPENDENT COLOR CORRECTION USING BLACK POINT AND WHITE POINT IN A NATURAL SCENE PICTORIAL IMAGE

The present invention is directed towards a method and apparatus for image-dependent color shifting in electronic documents of strongly color shifted natural scene images.

CROSS REFERENCE

Cross reference is made to the following co-pending applications: U.S. Ser. No. 08/131,172, filed Oct. 4, 1992, entitled "Image-Dependent Color Shifting of Strongly Color Shifted Images", by R. Eschbach (assigned to the same assignee as the present application); U.S. Ser. No. 08/132,973, filed Oct. 7, 1993, entitled "Image-Dependent Exposure Enhancement", by R. Eschbach, (assigned to the same assignee as the present application); and U.S. Ser. No. 08/133,231, filed Oct. 7, 1993, entitled "Image-Dependent Luminance Enhancement", by R. Eschbach et al, (assigned to the same assignee as the present application).

BACKGROUND OF THE INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality. One very common set of input documents includes photographs. Unfortunately, photography is an inexact science, particularly among amateurs, and original photographs are often poor. Alternately, technology, age or image degradation variations often result in pictures having an unsatisfactory and undesirable appearance. What is desired then, is a copy giving the best possible picture, and not a copy of the original.

Photography has long dealt with this issue. Analog filters and illumination variations can improve the appearance of pictures in the analog photographic process. Thus, for example, yellow filters enhance the appearance of white clouds against a blue sky in black and white images. Further, various electrophotographic devices, including digital copiers, can clean up and improve images by adjustment of threshold, filtering, or background suppression. Generally, these methods are manual methods which a user must select on an image by image basis. Unfortunately, the casual user is not skilled enough to perform these operations. The inability to perform image enhancement operations is exacerbated when additionally dealing with color controls.

In digital image processing, three possible choices are presented by the art in the area of image enhancement. In the first case, we can do nothing. Such a system is a stable system, in that it does no harm to an image, but its output documents are sometimes not satisfactory to the ultimate customer.

In a second case of image enhancement, the image can always be processed. It turns out than an improvement can usually be made to an image if certain assumptions are made that are accurate for most cases. In an exceptionally large set of image, increasing contrast, sharpness, and/or color saturation, will improve the image. This model tends to produce better images, but the process is unstable, in that for multi-generation copying, increases in contrast, saturation, or sharpness are undesirable and ultimately lead to a severe image degradation. Further, the process may undesirably operate on those images which are good ones.

Accordingly, we arrive at our third case of image enhancement, a process of automated image enhancement which operates to vary images which are not perceived as good images, but does not operate on images which do not need to be improved, thereby allowing a stable process.

One improvement that can be made to an image is correction of color shifts. When photographic color prints (a significant image source for electronic images) are made from negative or positive color images, the overall colors of the printer frequently do not correspond to those of the subject photographed. This may arise from a number of causes, such as change in sensitivity of the film due to aging, use of incorrect lighting, error in print processing and the like. If an exact print is made from such pictures based on the sensitivity which the film should have had, i.e., assuming that the positive or negative was correct, then the printer, particularly if a reflection prints (as opposed to a transparency) will display the errors to a greater extent than the transparency because such printers are nearly always viewed under conditions in which there are comparison objects. Of course, electronic images can only reproduce what is recorded, but given the possibility of pixel by pixel color editing.

U.S. Pat. No. 2,571,697 to Evans (hereinafter, Evan's Theorem) teaches that in photographic processes, an overall color shift can be made to the image without knowledge of the original colors. Initially, an assumption is made that if light passes though the printing apparatus onto a printing material without a color image or other obstruction in the light beam, the printing light or imaging illumination should produce a neutral gray (approximately). For a color shifted image, if light which will reproduce substantially as gray on the printing material is permitted to pass though the transparency so that a uniform amount of the light strikes the transparency at all points, the light passing through the transparency usually will not print as neutral gray, but will deviate from gray by an appreciable amount. The light which passes through the transparency is collected or integrated and each component primary color forming the light is measured by the use of a photoelectric cell. By comparing the amount of these colors received after passing through the transparency with the amount of these colors in light from the light source, a correction factor can be determined, and an adjusted light source can be provided, by inserting a filter in the light path. While the Evans Theorem works for a class of natural scene images, it fails in images which have unusual color usage, and particularly where a single color predominates the picture.

"Signal Processing by the Input Interface to a Digital Color Laser Copier", by A. Usami, SID 90 Digest, p. 498-500 (1990) compares Evan's Theorem with a color balance method which attempts to make the whitest points in each of the red, green and blue image signals equal to one another to correct color in an image. It is clear that the color of any object within the image is a function of the object's actual color and the light with which it is imaged, and accordingly that color corrections can be made if the illumination with which the object was imaged is known. An assumption is made that in almost any image, there is an almost specularly reflecting object that, when imaged, reflects the imaging illumination. If that object can be found (and ignoring saturated pixels) the light reflected from that object will closely match the imaging illumination. If the image is defined in term of r, g, b, color space, then $$W_{max} = \max(R_{max}, G_{max}, B_{max}).$$

where

Accordingly, a gain function $\gamma$ can be derived for each color where $$\gamma WR = W_{max}/R_{max}$$

$$\gamma WG = W_{max}/G_{max}$$

$$\gamma WB = W_{max}/B_{max}$$

Clearly, where color is correct, or close to correct, little change is made within the image. However, the described gain function has a tendency to only correct highlight areas in the image. Color shifts in shadow areas remain.

References cited herein are incorporated by reference for their teachings.

SUMMARY OF THE INVENTION

In accordance with the invention, there is provided a method of correcting color shifts produced by improper imaging in a natural scene image.

In accordance with one aspect of the invention, there is provided a method for correcting color shifting produced by improper imaging, in a digital signal representation of a natural scene image including the steps of: determining the white point of an image; determining the black point in an image; calculating a color correction for the image as a function of the white point and the black point and applying the calculated factor and offset to each pixel in the digital signal representation of a natural scene image.

The described process determines, for a digital signal representation of a natural scene image, the original imaging illumination. Additionally, the process determines how very dark areas of the image vary from gray. In correcting both these problems simultaneously, color correction is not constrained in shadow areas to the white point correction function.

These and other aspects of the invention will become apparent from the following descriptions used to illustrate the preferred embodiment of the invention, read in conjunction with the accompanying drawings in which:

DETAILED DESCRIPTION OF THE INVENTION

Figure 1:
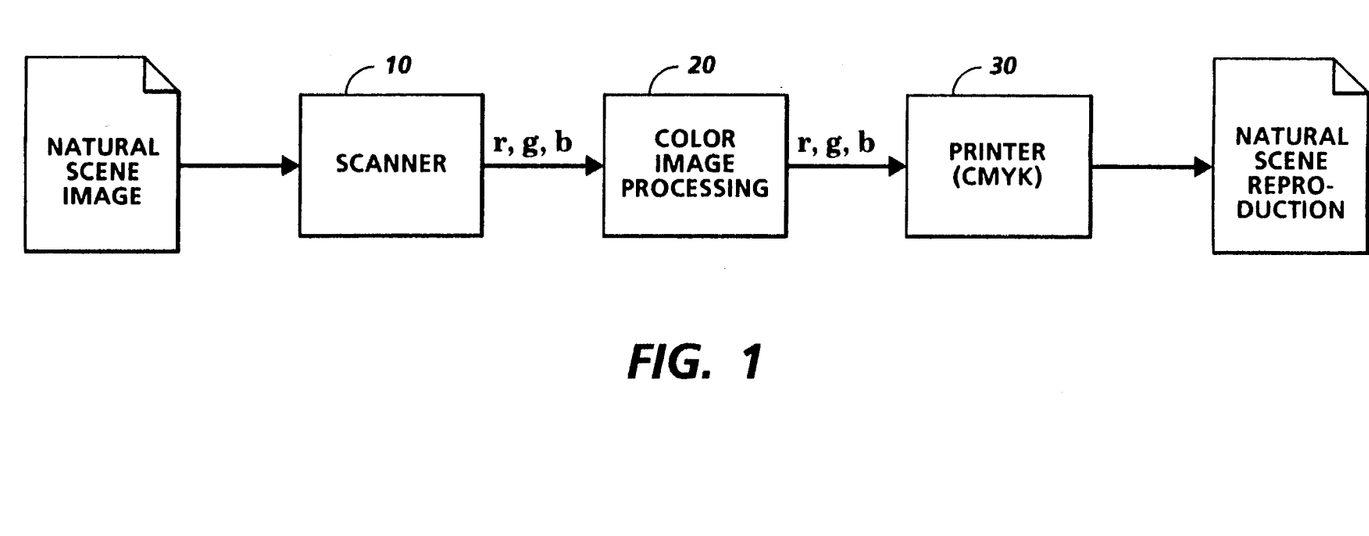
FIG. 1 shows a block diagram of a system employing the present invention.

Referring now to the drawings where the showings are for the purpose of describing the embodiment of the invention and not for limiting same, reference is made to the FIG. 1 scan-to-print system in which the present invention may find advantageous use.

FIG. 1 illustrates a scanner 10 which may conveniently be a color scanner which produces image signals defined in either RGB space for color images. These images of concern are pictorial in nature, i.e., they represent natural scenes. While certain computer generated imagery may qualify as representing nature scenes, the contemplated images are predominantly scanned photographs. The images themselves are defined in terms of pixels, wherein each pixel has a gray value which varies between a white level and a black level. In a currently desirable system, in which calculations may be done on 8 bits of information, 256 levels of gray will be available for use. Pixels are also identified in terms of position, i.e., a pixel defines a unique area within the image, identified by its position in a scan line, and the scan line position in a page. Color is therefore represented by triplets of gray pixels for each color pixel in the image, each triplet of gray pixel defining the color in each separation, which together form the color pixel.

Scanner 10 represents a device, which may include a slide scanner, a document scanner, an electronic camera etc., for reducing a visible image to electronic signals. The electronic signals produced by the scanner 10 are commonly given in terms of standard CIE color space defined in terms of red, green and blue colored lights, or alternatively, are correctable to such terms. These signals are edited, enhanced and prepared for printing at color image processing unit 20, which provides as an output r, g, b signals. Printer 30 receives the signal from color image processing unit 20, and provides for conversion of the signals to printer driver signals, commonly given in terms of the colorants that will be used in reproduction, typically Cyan, Magenta, Yellow and Key or black (CMYK). The printer has as an output the natural scene image, which, hopefully, closely resembles the scene viewed by the user originally. Alternatively, the processed image from color image processing unit 20 is displayed on a television screen, CRT display or the like.

The output of a scanner 10 may be directed to an automated image enhancement system which will be further defined herein. For our purposes, the automated image enhancement system may include a segmentation system which can identify within a document a type of image, including pictorial and non-pictorial image areas. It will be assumed that the output of the automated image enhancement system that is described herein will be directed to a printer, CRT, or like device. These devices may have many characteristics and may be laser printers, or ink jet printers or LED displays or CRT displays. However, they have as a common requirement the representation of gray pictorial images. This may be done with gray printing or pseudo gray printing.

In terms of deriving data for operation by the present image enhancement system, a prescan may optionally be performed on a document placed on a copying platen and scanned by the electro-optical system of the scanner to produce a signal representing the document image. Alternatively, the image may be directed to the automated image enhancement system from a memory, having previously been scanned or derived some other system, in which case, the received image is sampled as required.

The prescan may be performed in an undersampled fashion, i.e., the image need not be sampled at the ultimate resolution of the system for the purposes of enhancement. In practice, it has been determined that a relatively small number of pixels representative of and dispersed through the entire image can accurately represent the image for this purpose. In our particular embodiment, we use a block of pixels derived from the image in approximately 512 pixels×512 pixels. The primary purpose of this selection is to improve the speed at which a software image enhancement system can process the pictorial images. Sampling at common image resolutions does not improve the results noted in the inventive process herein described significantly, and dramatically increases the software processing time required. Hardware embodiments of the described inventive process might be designed not to undersample the image.

Initially, the principle of the invention will be discussed. Usami teaches that an assumption can be made that in almost any image, there is an almost specularly reflecting object that, when imaged, reflects the imaging illumination. If that object can be found (and ignoring saturated pixels) the light reflected from that object will closely match the imaging illumination.

Usami proposes to find the white point by examining each color triplet defining the color of an image signal or pixel in the image. In each triplet one or more pixels define a triplet minimum min(R,G,B). Usami compares each of these triplet minimums to find the largest thereof. In a preferred embodiment, triplets including saturated values are not considered. For the purposes of this application, saturation is defined as values equal to 255 or the system maximum. The pixel defined by the largest triplet minimum max[min(R,G,B)] is defined as including the white point. The function of this procedure is to find the color closest to white. Clearly other methods of finding the whitest pixel exist, such as, for example, comparing a calculated distance of the pixel color from white. However, for the purposes of discussion, Usami's method will be used.

Once having determined the color closest to white, in an example where the triplet indicating white would be given as:

$$(R_{max}, G_{max}, B_{max}) = \max[\min(R,G,B)] \quad (40)$$

the triplet is reviewed to determine the single value $R_{max}$, $G_{max}$ or $B_{max}$ therein closest to white. This value, which in a typical 8 bit digital system having density values varying from 0–255 where 0 is defined as black and 255 is defined as white, will be the largest value in the triplet, i.e. Wmax= max($R_{max}, G_{max}, B_{max}$). Of course, other conventions defining color are possible, for example 0=white and 255=black.

White is defined as the point in subtractive color systems where the separation densities are at a maximum and equal, or red=green=blue=255. In the case of a color shifted image, this will not be true. However, there still should be a point in a natural scene image which is white, and the $W_{max}$ evaluation should have found such a point.

As has been previously discussed however, a simple gain function has a tendency to only correct highlight areas in the image. Color shifts in shadow areas remain. The results are color shifted and muddy blacks. Desirably a correction is made simultaneously for black. In accordance with the invention, the black point of the image is determined by examining each color triplet defining the color of an image signal or pixel in the image. Once again, in each triplet one or more pixels define a triplet maximum max(R, G, B). Each of these triplet maximums is examined to find the triplet having the smallest maximum, min[max(R, G, B)]. The pixel defined by the smallest triplet maximum is defined as including the black point. The function is this procedure is to find the color closest to black. Clearly other methods of finding the black point exist, such as, for example, comparing the distance of the pixel color from black.

Once having determined the color $R_{min}$, $G_{min}$ or $B_{min}$ closest to black, the triplet is reviewed to determine the single separation value therein closest to black. This value, Wmin=min($R_{min},G_{min},B_{min}$), which in a typical system having density values varying from 0–255 where 0 is defined as black and 255 is defined as white, will be the smallest value in the triplet. Of course, other conventions defining color are possible, for example, 0=white and 255=black.

Black is defined as the point in subtractive color systems where the separation densities are at a minimum and equal, or red=green=blue=0. In the case of a color shifted image, this will not be true. However, there still should be a point in a natural scene image which is black, and the $W_{min}$ evaluation should have found the point in the image which should have been black.

Accordingly, the color correction can be performed using the function:

$$Sep_{out} = \frac{(W_{max} - W_{min})}{(Sep_{max} - Sep_{min})}(Sep_{in} - Sep_{min}) + W_{min} \quad (1)$$

Where
  $Sep_{in}$ is a single input pixel value in a selected one of the red, green and blue separations;
  $Sep_{out}$ is a single corrected output pixel value in the selected red, green or blue separations;
  $Sep_{max}$ is the selected separation pixel value in the triplet max[min(R,G,B)]
  $Sep_{min}$ is the selected separation pixel value in the triplet min[max(R,G,B)]
  $W_{max}$ is the determined white value
  $W_{min}$ is the determined black value The result is that images that have crossed color curves (e.g., red in highlight areas but green in the shadow areas) can be corrected.

Figure 2:
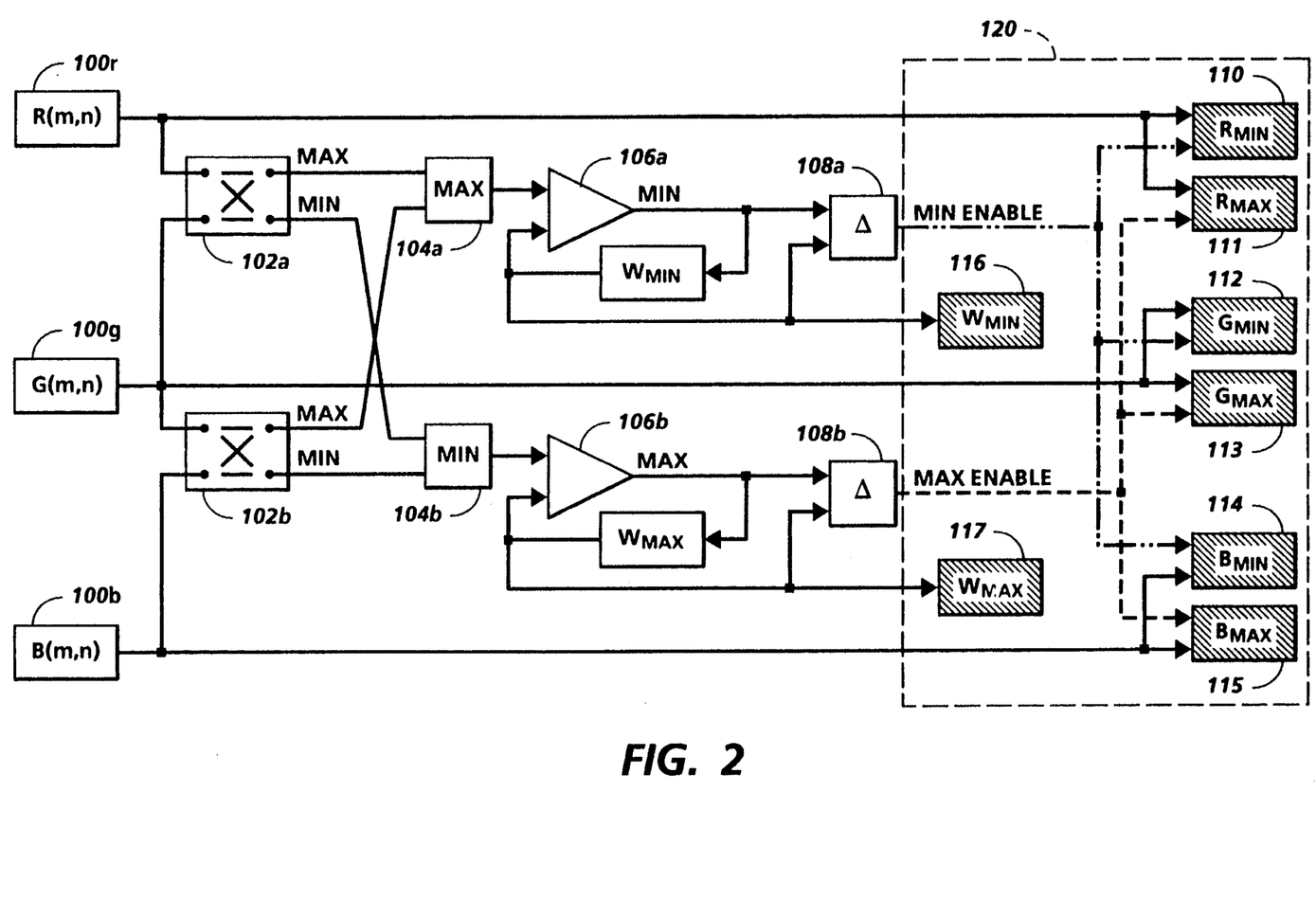
FIGS. 2 and 3 together show a block diagram of a system accomplishing the present invention.

Now considering an embodiment of the invention, in accordance with the invention, and with reference to FIG. 2, received color density signals, in this case R, G, B signals, are initially buffered at signal buffers 100r, 100g, 100b, where each signal R(m,n), signal G(m,n) and signal B(m,n) represent a separation in the pictorial derived. The minimum and maximum separation density value for each triplet forming a color pixel are determined at separation comparators 102a, 102b and 104a, 104b, which are arranged for processing separation signals R, G and B to determine the minimum value for R,G,B(m,n) and the maximum value for R,G,B(m,n). Once the largest or maximum max[R,G,B(m,n)] is found, that value is compared to the current minimum $W_{min}$ at minimum determinator 106a. Similarly, the minimum min[R,G,B(m,n)] is compared to the current maximum $W_{max}$ at maximum determinator 106b. At the beginning of the processing, $W_{min}$ and $W_{max}$ can be preloaded with the values max[R,G,B(1,1)] and min[R,G,B(1,1)] respectively, or any constants that allow processing, e.g., $W_{min}$=256 and $W_{max}$=0. The outputs of blocks 106a and 106b are then stored as $W_{min}$ and $W_{max}$ respectively.

Detectors 108a and 108b, determine whether minimum and maximum determinators 106a and 106b have determined a new minimum $W_{min}$ and/or new maximum $W_{max}$, and upon such an occurrence, produce enabling signal "min enable" indicating detection of a new minimum $W_{min}$ and/or an enabling signal "max enable" indicating detection of a new maximum $W_{max}$. The "min enable"0 signal enables the storage of the current R,G,B triplet into memory storage locations or registers 110, 112, and 114 as $R_{min}$, $G_{min}$, and $B_{min}$, while the "max enable" signal enables the storage of the current R,G,B triplet into memory storage locations 111, 113, and 115 as $R_{max}$, $G_{max}$, and $B_{max}$. Values $W_{min}$ and $W_{max}$ are stored also in memory locations 116 and 117, which can be identical to the memory locations used as input to minimum detector 108a and maximum detector 108b respectively. Values 110 through 117 will be used to determine the input-output relationships as defined in equation 1. Conveniently, a device memory 120 is provided, suitable for storing a plurality of 8 bit separation pixel values at addressable locations therein.

Figure 3:
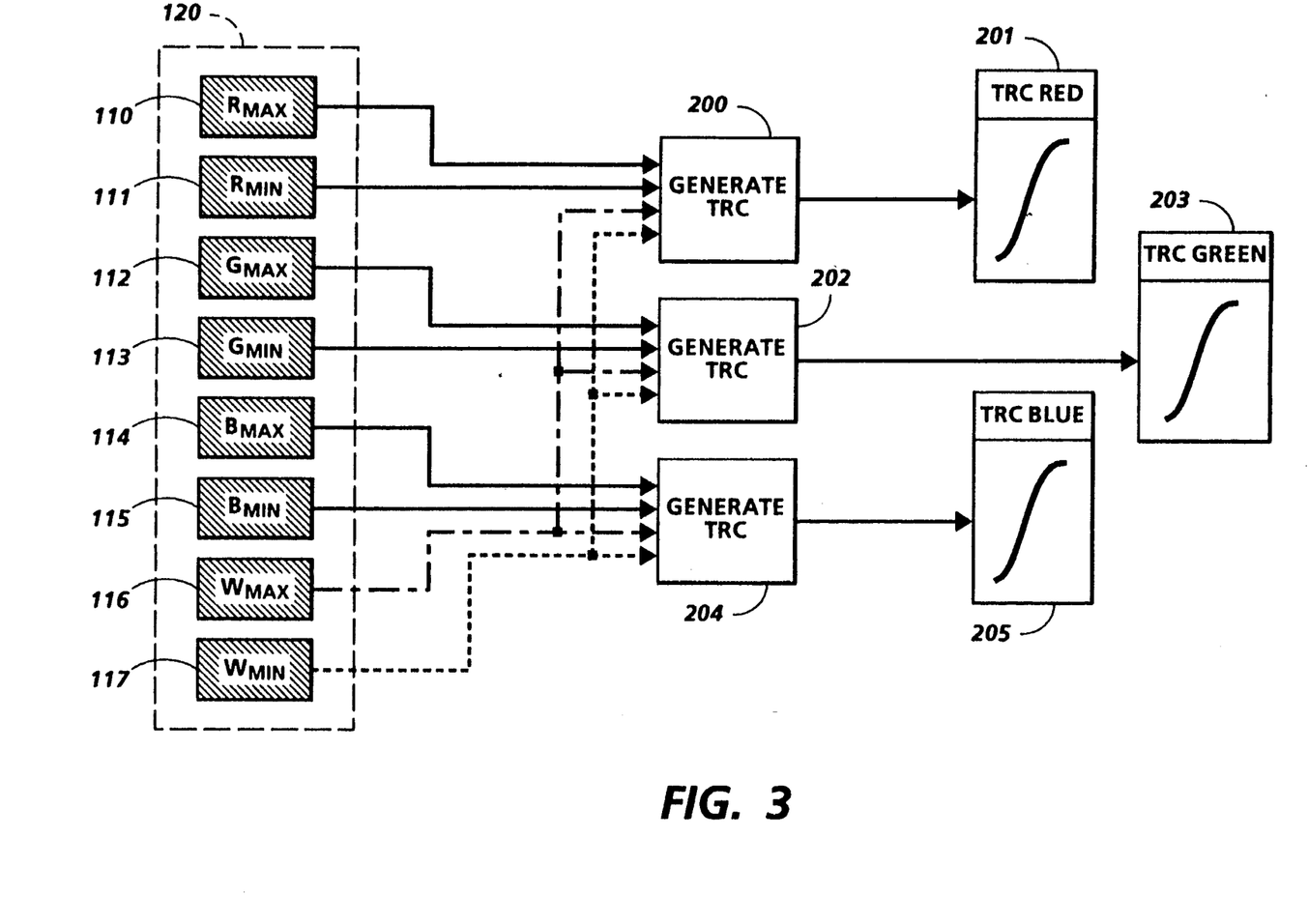

With further reference to FIG. 3, values stored in registers 110 through 117 are used to calculate three tone-reproduction curves (TRC's) for the color separations R, G, and B. Here, values 110, 111, 116 and 117 are used at block 200 to determine the red separation TRC 201, values 112, 113, 116 and 117 are used at block 202 to determine the green separation TRC 203, and values 114, 115, 116, and 117 are used at block 204 to determine the blue separation TRC 205. The TRC curves allow the generation of a 1:1 mapping of input values to corrected output values.

Figure 4:
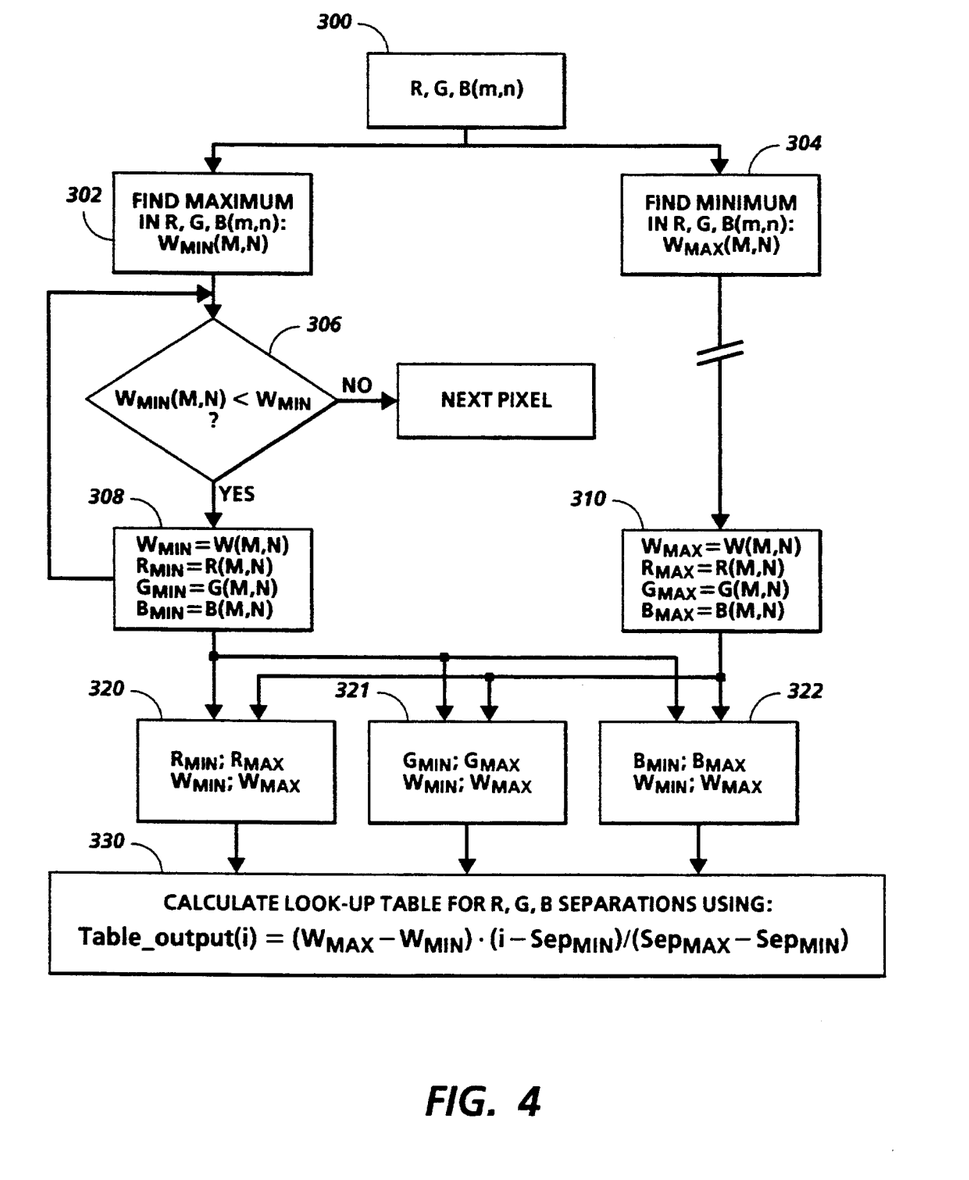
FIG. 4 shows a flow chart of the inventive method.

FIG. 4 shows a flowchart of the inventive process. At steps 300 input data R,G,B(m,n) reflecting a natural scene image is received. At step 302, the maximum of the R,G,B triplet max[R,G,B(m,n)] is calculated and designated $W_{min}(m,n)$. At step 304 in a potentially parallel fashion, the minimum of the R,G,B triplet min[r,g,b(m,n)] is calculated and designated $W_{max}(m,n)$. Values $W_{min}(m,n)$ and $W_{max}(m,n)$ are processed in symmetric fashion, and accordingly only the path describing the processing of $W_{min}(m,n)$ is described. At step 306, $W_{min}(m,n)$ is compared to stored reference value $W_{min}$, where the reference value can be determined by $W_{min} = W_{min}(1,1)$ or $W_{min} = 255$, or the like. At step 306, if $W_{min}(m,n)$ was larger or equal $W_{min}$, the process increments to the next input pixel triplet. If $W_{min}(m,n)$ was smaller than $W_{min}$, the $W_{min}$ value is updated via $W_{min} = W_{min}(m,n)$ in temporary memory at step 308 and simultaneously $R_{min}$, $G_{min}$, and $B_{min}$ are updated via $R_{min} = R(m,n)$; $G_{min} = G(m,n)$; $B_{min} = B(m,n)$. Correspondingly, $W_{max}$, $R_{max}$, $G_{max}$, and $B_{max}$ are stored in temporary memory at step 310. At step 320 the TRC for the red separation is calculated using $R_{min}$, $R_{max}$, $W_{min}$, and $W_{max}$, at step 321 the green TRC is calculated using $G_{min}$, $G_{max}$, $W_{min}$, and $W_{max}$, and at step 322 the blue TRC is calculated using $B_{min}$, $B_{max}$, $W_{min}$, and $W_{max}$, using the equation given at step 330 for each separation.

A multiplication and addition step operative on every value could be used instead of the look-up table.

It will no doubt be appreciated that the present invention can be accomplished through application software accomplishing the functions described, though a hardware circuit, which will probably provide optimum speed, or though some combination of software and hardware.

The present invention has been described in respect to the Xerox RGB color space, but it will no doubt be appreciated that the invention can be implemented in other color spaces.

The present invention has been described in the context of mapping the whitest unsaturated point in the image to the triplet $(W_{max}, W_{max}, W_{max})$ which might not be the whitest white obtainable and the blackest unsaturated point in the image to $(W_{min}, W_{min}, W_{min})$ which might not be the blackest black obtainable. A simple modification within the scope of the present invention is to map the whitest unsaturated point to the whitest obtainable white and the blackest unsaturated point to the blackest obtainable black.

It is also within the scope of the present invention that the determination of the whitest point in the image and the blackest point in the image is done including saturated values for either whitest point determination or blackest point determination or for both determinations.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method for reproducing a natural scene image image from electronically encoded intensity signals, while correcting color shift therein produced by improper imaging including the steps of:

receiving an electronically encoded natural scene image S(m,n), providing a plurality of N separations $S_{sep1} \ldots S_{sepN}$ each describing intensity for a given color primary forming the image, each separation formed by a plurality of input separation intensity signals $S_{sepN}(m,n)$ defining the intensity for a discrete area therein, whereby color for a discrete area in the image is a combined output device response to separation intensity signals $S_{sepN}(m,n)$ for the corresponding discrete area from each separation $S_{sep1} \ldots S_{sepN}$;

identifying the combination of separation intensity signals $S_{sepN}(m,n)$ in the image providing the color closest to white, and further identifying the largest signal $S_{sepN}(m,n)$ in the combination as white signal $W_{max}$;

identifying the combination of separation intensity signals $S_{sepN}(m,n)$ in the image providing the color closest to black, and further identifying the smallest signal $S_{sepN}(m,n)$ in the combination as black signal $W_{min}$;

for each separation, modifying each intensity signal $S_{sepN}(m,n)$ with a function:

$$Sep_{out} = \frac{(W_{max} - W_{min})}{(Sep_{max} - Sep_{min})} (Sep_{in} - Sep_{min}) + W_{min}$$

Where $Sep_{in}$ is a single input intensity signal in $S_{sepN}(m,n)$ in a selected one of the N separations, $Sep_{out}$ is a single output intensity signal corresponding to $Sep_{in}$ in $S_{sep}(m,n)$ in the selected separation, $Sep_{max}$ is the separation signal in the combination of signals $S_{sepN}(m,n)$ providing the color closest to white, Sep$_{min}$ is the separation signal in the combination of signals S$_{sepN}$(m,n) providing the color closest to black;

directing the modified signals to an output device to form a color shifted signals.

2. The method as described in claim 1, wherein there are three separations.

3. The method as described in claim 2, wherein the three separations correspond to the color primaries red, green and blue.

4. The method as defined in claim 1, wherein the color closest to white is the combination of signals S$_{sep}$(m,n) in the image having the largest minimum signal.

5. The method as defined in claim 1, wherein the color closest to black is the combination of signals S$_{sep}$(m,n) in the image having the smallest maximum signal.

6. The method as defined in claim 1, wherein the modifying step includes the following substeps:

calculating for each possible intensity signal in each separation a modified intensity signal;

storing the modified intensity signals in an addressable look-up table in memory;

receiving intensity signals S$_{sep}$(m,n) as addresses to the look-up table; and directing modified intensity signals to an the output step.

7. The method as defined in claim 1, where the color white is identified from a set of combined signals S$_{sep}$(m,n) which do not include maximum system values.

8. The method as defined in claim 1, where the color black is identified from a set of combined signals S$_{sep}$(m,n) which do not include minimum system values.

9. An apparatus for reproducing a natural scene image image from electronically encoded intensity signals, while correcting color shift therein produced by improper imaging comprising:

means for receiving an electronically encoded natural scene image S(m,n), providing a plurality of N separations S$_{sep1}$ ... S$_{sepN}$ each describing intensity for a given color primary forming the image, each separation formed by a plurality of input separation intensity signals S$_{sepN}$(m,n) defining the intensity for a discrete area therein, whereby color for a discrete area in the image is a combined output device response to separation intensity signals S$_{sepN}$(m,n) for the corresponding discrete area from each separation S$_{sep1}$ ... S$_{sepN}$;

means for identifying the combination of separation intensity signals S$_{sepN}$(m,n) in the image providing the color closest to white, and further identifying the largest signal S$_{sepN}$(m,n) in the combination as white signal W$_{max}$;

means for identifying the combination of separation intensity signals S$_{sepN}$(m,n) in the image providing the color closest to black, and further identifying the smallest signal S$_{sepN}$(m,n) in the combination as black signal W$_{min}$;

means for modifying the intensity value of each signal in each separation N as a function of the separation signal S$_{sepN}$(m,n) in the color closest to white, the separation signal S$_{sepM}$(m,n) in the color closest to black, W$_{min}$ and W$_{max}$;

means for directing the color shifted signals to an output device.

10. The apparatus as described in claim 9, wherein there are three separations.

11. The apparatus as described in claim 10, wherein the three separations correspond to the color primaries red, green and blue.

12. The apparatus as defined in claim 9, wherein the color closest to white is the combination of signals S$_{sep}$(m,n) in the image having the largest minimum signal.

13. The apparatus as defined in claim 9, wherein the color closest to black is the combination of signals S$_{sep}$(m,n) in the image having the smallest maximum signal.

14. The apparatus as defined in claim 9, wherein the modifying means includes:

means for calculating for each possible intensity signal in each separation a modified intensity signal;

means for storing the result in an addressable look-up table in memory;

means for receiving intensity signals S$_{sep}$(m,n) as addresses to the look-up table; and means for directing modified intensity signals to an output step.

15. The apparatus as defined in claim 9, wherein the modifying means modifies each intensity signal S$_{sepN}$(m,n) forming the separation with a function:

$$Sep_{out} = \frac{(W_{max} - W_{min})}{(Sep_{max} - Sep_{min})} (Sep_{in} - Sep_{min}) + W_{min}$$

Where

Sep$_{in}$ is a single input intensity signal in S$_{sepN}$(m,n) in a selected one of the N separations, Sep$_{out}$ is a single output intensity signal corresponding to Sep$_{in}$ in S$_{sepN}$(m,n) in the selected separation, Sep$_{max}$ is the selected separation signal in the combination of signals S$_{sepN}$(m,n) in the image providing the color closest to white, Sep$_{max}$ is the selected separation signal in the combination of signals S$_{sepN}$(m,n) in the image providing the color closest to black.

16. A color reproduction system system, including color correction, for reproduction of natural scene original images in which the color is undesirably shifted including:

a color image scanner, producing from a scanned natural scene original document in which the color is undesirably shifted, a set of electronic signals in a format providing a plurality of N separations describing intensity for N color primaries within the image, each separation formed by a plurality of separation intensity signals S$_{sepN}$(m,n) for discrete areas therein, whereby color for a discrete area in the image is a combined output response of separation intensity signals S$_{sepN}$(m,n) for the corresponding area m,n in the image from each of the N separations;

a separation maximum detector receiving as an input the separation intensity signals S$_{sepN}$(m,n) for the image and producing as an output a set of N separation intensity signals S$_{sep1max}$ ... S$_{sepNmax}$ representing an unsaturated color in the image closest to white and a maximum separation intensity signal W$_{max}$ thereof;

a separation minimum detector receiving as an input the separation intensity signals S$_{sepN}$(m,n) for the image and producing as an output a set of N separation intensity signals S$_{sep1min}$ ... S$_{sepNmin}$ representing a color in the image closest to black and a minimum separation intensity signal $W_{min}$ thereof;

a shift correction calculation circuit, calculating for each possible intensity signal in each separation 1 ... N a modified intensity signal as a function of the separation signal $S_{sepN}(m,n)$ in the color closest to white, the separation signal $S_{sepM}(m,n)$ in the color closest to black, $W_{min}$ and $W_{max}$;

a device memory receiving said set of corrected separation intensity signals in a table for each separation, addressable by a separation intensity value from the color scanner;

an output reproduction device, operative responsive to the corrected signals in each of N separation to produce a color response.

17. The device as defined in claim 16, wherein there are three separations.

18. The device as described in claim 17, wherein the three separations correspond to the color primaries red, green and blue.

19. The apparatus as defined in claim 16, wherein the color closest to white is the combination of signals $S_{sepN}(m,n)$ in the image having the largest minimum signal.

20. The apparatus as defined in claim 16, wherein the color closest to black is the combination of signals $S_{sepN}(m,n)$ in the image having the smallest maximum signal.

21. The apparatus as defined in claim 16, wherein the calculating includes:

a calculating circuit deriving a modification for each possible intensity signal in each separation a modified intensity signal;

an addressable memory storing the result in a look-up table;

a storage control arrangement for storing calculated values to the addressable memory and directing modified intensity signals to an output step.

22. A color reproduction system including color correction for reproduction of electronically encoded natural scene original images in which the color is undesirably shifted including:

a color image scanner, producing from a scanned original image $S(m,n)$ in which the color is undesirably shifted, a set of electronic signals in a format providing separations describing intensity for red, green and blue colors, each separation formed by a plurality of intensity signals for discrete areas in the image, whereby color for a discrete area in the image is a combined output response of a triplet of intensity signals for a discrete area (m,n) from each separation R, G, B;

a maximum detector receiving as an input the separation intensity signals from each separation and identifying as an image white point a triplet of intensity signals containing the color closest to white and one intensity signal $W_{max}$ of the triplet which is largest;

a minimum detector receiving as an input the separation intensity signals from each separation and identifying as an image black point a triplet min containing the color closest to black and one intensity signal $W_{min}$ of the triplet which is largest;

a color shift calculation circuit determining for each separation r, g, b a corrected intensity values in accordance with the function:

$$R_{out} = \frac{(W_{max} - W_{min})}{(R_W - R_B)} (R_{in} - R_B) + W_{min}$$

$$G_{out} = \frac{(W_{max} - W_{min})}{(G_W - G_B)} (G_{in} - G_B) + W_{min}$$

$$B_{out} = \frac{(W_{max} - W_{min})}{(B_W - B_B)} (B_{in} - B_B) + W_{min}$$

Where $(R,G,B)_{in}$ are single input intensity signals in a selected separations, $(R,G,B)_{out}$ are single output intensity signals corresponding to $(R,G,B)_{in}$ in a selected separation, $(R,G,B)_w$ is the corresponding separation signal in the color closest to white, $(R,G,B)_B$ is the corresponding separation signal in the color closest to black.

an output reproduction device, operative responsive to the corrected signals $(R,G,B)_{out}(m,n)$ in each of the separations to produce a color response $S'(n,m)$.

* * * * *